United States Patent [19]
Fiala

[11] 3,842,930
[45] Oct. 22, 1974

[54] COLLISION SENSOR

[75] Inventor: Ernst Fiala, Braunschweig-Querum, Germany

[73] Assignee: Volkswagenwerk Aktiengesellschaft, Wolfsburg, Germany

[22] Filed: Apr. 6, 1972

[21] Appl. No.: 241,788

[30] Foreign Application Priority Data
Apr. 24, 1971 Germany.......................... 2120075

[52] U.S. Cl............. 180/91, 180/105 R, 200/61.44
[51] Int. Cl............................................ B60r 21/00
[58] Field of Search............ 180/91, 77; 280/150 B, 280/150 AB

[56] References Cited
UNITED STATES PATENTS
2,185,936   1/1940   Yamada............................. 180/92

| | | | |
|---|---|---|---|
| 2,508,149 | 5/1950 | Eliassen............................... | 180/91 |
| 3,495,675 | 2/1970 | Hass et al. ........................... | 180/91 |
| 3,552,769 | 1/1971 | Kemmerer........................... | 180/91 |

FOREIGN PATENTS OR APPLICATIONS
1,093,233   11/1960   Germany............................ 180/91

Primary Examiner—Kenneth H. Betts
Assistant Examiner—Jack D. Rubenstein
Attorney, Agent, or Firm—Brumbaugh, Graves, Donohue & Raymond

[57]   ABSTRACT

An improved collision sensor for vehicles comprising a sensor adapted to extend beyond the main body of the car for a distance dependent upon the speed at which the car is travelling and responsive to contact pressure for activating a safety mechanism within the car, and a displacement mechanism for controlling the displacement of the sensor beyond the main body of the car as a function of the car's speed.

2 Claims, 4 Drawing Figures

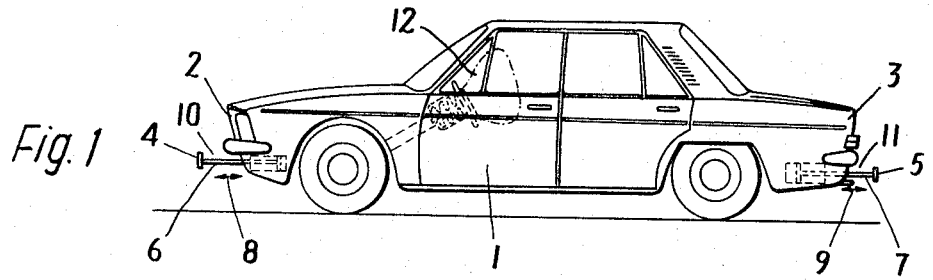
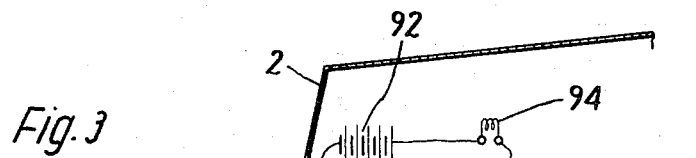
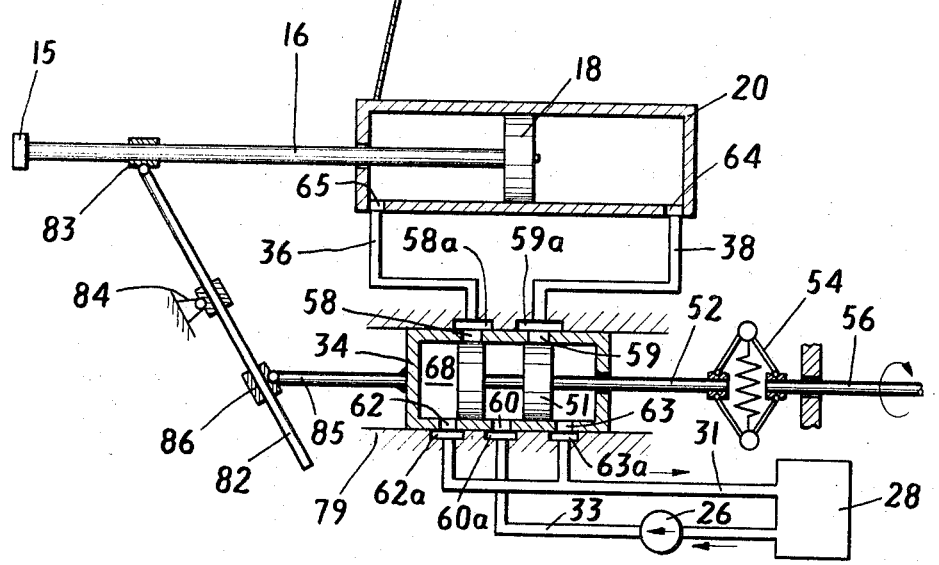

3,842,930

COLLISION SENSOR

BACKGROUND OF THE INVENTION

This invention relates to improvements in devices for activating safety mechanisms, such as safety belts, within a vehicle and, more particularly, to a new and improved collision sensor adapted to extend beyond the main body of the vehicle for distances dependent upon the speed at which the vehicle is travelling.

The improved collision sensor of the present invention is adapted for use with safety devices and, in particular, with safety devices of the type disclosed in my copending patent application entitled "Safety Belt Tensioning Arrangement" Ser. No. 242,152, filed Apr. 7, 1972. As described in this application, I have devised an improved safety belt that allows an occupant of the vehicle freedom of movement during normal driving conditions, but holds the occupant securely in position when a collision occurs. The improvement resides in the combination of a biased pivotal lever, one end of which is releasably coupled to the safety belt, and a displaceable piston adapted to respond to contact pressure resulting from a collision to rotate the lever away from the passenger and thereby tighten the safety belt around the passenger. Further provided is a mechanism for causing the release of the safety belt from the lever when the biasing exerted on the lever returns the lever to its normal pre-collision position.

My invention is also adapted for use with safety devices of the type disclosed in German Pat. No. 896,312 entitled "Device for Protecting Occupants of Vehicles Against Injuries in Collisions." As disclosed in this patent, an inflatable receptacle is activated by a pressure responsive sensor positioned on the bumper of the car to protect the occupant of the car from major injury in the event of an accident.

Each of the foregoing improvements in automotive safety devices incorporates a collision sensor which is located at or near the main body of the vehicle. However, the times within which the safety mechanisms are activated are inversely proportional to the relative speeds of the vehicle and the object with which the vehicle may collide. Thus, if the relative velocities of the vehicle and object are high, there may be insufficient time to activate the protection devices within the vehicle and thereby protect the occupant from serious injury.

SUMMARY OF THE INVENTION

Accordingly, it is an object of the present invention to provide a sensor for safety devices of the types disclosed in my copending patent application entitled "Safety Belt Tensioning Arrangement" Ser. No. 242,152, filed Apr. 7, 1972 and German Pat. No. 896,312 which overcomes the disadvantages of such devices at high speeds.

This and other objects of the present invention are accomplished by the collision sensor of the present invention which comprises a sensor adapted to extend beyond the main body of the vehicle for a distance dependent upon the speed at which the vehicle is travelling and responsive to contact pressure for activating a safety mechanism within the vehicle, and a displacement mechanism for extending the sensor beyond the main body of the vehicle as a function of the vehicle's speed.

As described hereinafter, the displacement of the sensor of the present invention is controlled generally as a function of the speed at which the vehicle is moving. However, in some situations it is advantageous to displace the sensor from the vehicle in small increments depending upon predetermined fixed increments in the speed of the vehicle. For example, it may be desirable to have the sensor displaced from the vehicle by a small fixed distance when the vehicle is moving at a speed of from 0 to 10 miles per hour to provide the same protection to the occupants of the vehicle both while the vehicle is parked or stopped and while the vehicle is moving slowly. In addition, the sensor may be displaced from the vehicle as a function of the vehicle speed up to a certain speed such as, for example, 60 miles per hour, and be retained in that position for speeds in excess of that fixed speed.

BRIEF DESCRIPTION OF THE DRAWINGS

In the drawing:

FIG. 1 is a schematic diagram of a car incorporating two improved collision sensors arranged according to the present invention;

FIG. 2 is a schematic diagram of a system for displacing the collision sensor of the present invention as a function of the vehicle's speed and FIGS. 3 and 4 are schematic diagrams illustrating devices for controlling the control valve to permit the displacement of the sensor as a function of vehicle velocity.

DESCRIPTION OF THE PREFERRED EMBODIMENTS

Figure 2:
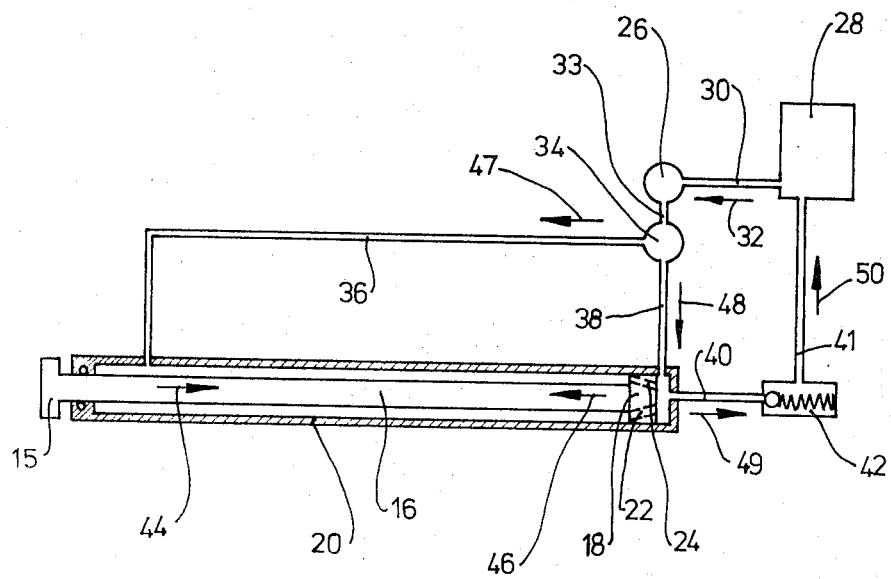

In an illustrative embodiment of the collision sensor arrangement according to the present invention, as shown in FIG. 1, there is provided a car 1 with front and rear ends 2 and 3, respectively. A collision sensor 4 is shown reciprocally mounted in the front end 2 of the car and serves the purpose of detecting an object in front of the car 1 before the object actually collides with the car.

A reciprocating shaft 6, supports the collision sensor 4 and extends above the road bed by a sufficient distance to ensure that the collision sensor 4 will not strike the road bed if the car is driven over rough and bumpy roads. The other end of the shaft 6 is secured to the vehicle 1 in a manner hereinafter described with reference to FIG. 2.

The position of the shaft 6 relative to the width of the vehicle 1 is not critical. Where only one collision sensor is used, the sensor may be mounted centrally of the front end. Where two sensors are mounted on the front end, one sensor may be mounted on each side of the front end 2 below the headlights of the vehicle.

In a manner which will be described more fully subsequently, the position of the sensor 4 from the front end 2, generally indicated by the numeral 10, is variable and is generally a function of the velocity of the vehicle 1. The supporting shaft 6 has a reciprocating motion along its longitudinal axis toward and away from the body of the car as shown by the arrows 8.

In similar fashion, there is provided a collision sensor 5 which is supported by a shaft 7 for the rear end 3 of the car to detect and object closing in on the rear end of the car. The arrows 9 indicate that the shaft 7 may be driven toward and away from the rear end of the car. The reference numeral 11 generally indicates the distance between the sensor 5 and the rear section 3.

The purpose in providing sensors which extend away from the main frame of the car is to provide enough time for safety mechanisms, such as an inflatable receptacle 12, to be fully activated before the impact is felt throughout the main body of the car. The displacement of the sensor from the vehicle is preferably made a function of the speed at which the car is travelling. The scale of the displacement system or the magnitude of displacement for a given car speed may be adjusted to account for the large relative velocities between two cars travelling in opposite directions or may be adjusted to account for the smaller relative velocities between a moving car and a stationary object. Also, it may be feasible to displace the sensor from the car in increments or as a step function and then fix the displacement after a certain speed, e.g. 60 miles per hour.

Referring now to FIG. 2 of the drawing, there is provided an hydraulic system suitable for controlling the displacement of the collision sensor 4 from the vehicle 1. A similar hydraulic system is described in my German Pat. No. 1,093,233. The system of FIG. 2 is meant to be illustrative of the type of system that may be suitable and it is within the scope of the present invention to utilize other systems which are known to those skilled in the art to displace the sensor as a function of the car's speed. The contribution of the invention is the variable displacement of the sensor and not in the apparatus utilized to displace the sensor.

As shown in FIG. 2, there is provided a collision sensor 15 that is the same as the collision sensor 4, as shown in FIG. 1. The collision sensor 15 is affixed to the end of a piston rod 16 that is connected to a piston 18, which combination is capable of reciprocating motion within a fluid containing cylinder 20. The piston 18 has a generally frusto-conical shape and includes a pair of throttling bores 22 and 24. The piston rod 16 shown in FIG. 2 is substantially the same as the support member 6 shown in FIG. 1.

The displacement of the collision sensor 15 from the front end of the car is controlled by variations in fluid pressures that are created on the piston 18 positioned in the cylinder 20. The control of the fluid pressure is through a pump 26 which receives a fluid, such as oil, from a resevoir 28 through a conduit 30. An arrow 32 indicates the direction of the fluid flow. The output of the pump 26 passes via a conduit 33 through a control valve 34, described more fully hereinbelow, and then through a pair of conduits 36 and 38 opposite ends of the cylinder 20.

The function performed by the apparatus, as shown in FIG. 2, is to control the position of the collision sensor 15 in such a manner that its distance from the front end of the car may be made a function of the speed of the car. More particularly, positioning of the sensor may be a function of velocity up to a certain velocity and thereafter the displacement may remain constant.

The control valve 34 which controls the positioning of the collision sensor 15 is a two-way valve that permits the fluid from conduit 33 to pass into either the conduit 36 or the conduit 38 as a function of the car's forward speed. Conduits 40 and 41 provide a return flow path for the fluid to the reservoir 28 through a pressure relief valve 42. The arrows 44 and 46 indicate the reciprocating movement of the rod 16, while the arrows 47-50 indicate the direction of fluid flow within the FIG. 2 system.

The control valve 34 controls the displacement of the position rod 16 and thus the sensor 15 as a function of vehicle velocity. To attain this relationship, the control valve 34 is controlled by the vehicle acceleration. This may be accomplished by the use of a conventional mechanical differentiator that receives a shaft rotation related to velocity and provides an output related to acceleration. The valve may also be controlled in a step function manner whereby displacement is related to velocity generally, but when a selected velocity is reached, the displacement remains constant. This may be achieved by making the positioning of the valve a function of the displacement of the piston rod itself in a conventional feedback network.

The operation of the positioning of the collision sensor is described in the following manner. There are two separate modes of operation, viz., the collision sensor 15 moving away from the vehicle and the collision sensor 15 moving toward the vehicle. In the former mode, the control valve 34 is positioned so as to allow fluid to pass from the conduit 33 into the conduit 38. The amount of fluid passing through the conduit 38 is controlled as a function of speed. Thus, as the car accelerates, greater and greater amounts of fluid are passed into the cylinder 20. The high pressure fluid creates a force on the piston 18 so as to cause the piston 18 to move to the left or outwardly. Excess oil pressure buildup on the right of the piston 18 is vented by the relief valve 42 which permits return flow of the fluid through the conduit 41 to the reservoir 28. In the other mode of operation or as the car is decelerating, the conduit 33 connects to the conduit 36 and fluid under pressure passes into the cylinder 20 to drive the piston 18 and hence the collision sensor 15 inwardly.

The collision sensor 4 (FIG. 1) may activate a safety mechanism in any one of several known ways. One example would be arranging on the collision sensor a normally open electrical contact that is closed when pressure is exerted on the collision sensor 4. The contact may then be connected in series with the battery of the vehicle and a solenoid to energize the solenoid and cause the release of compressed gas into an inflatable receptacle. In this manner the solenoid would not energize until the contact is closed.

FIG. 3 illustrates a device which displaces the sensor 15 in a continuous manner in relation to the speed of the vehicle. Corresponding elements in FIGS. 2 and 3 are identified by the same reference numbers. The valve 34 contains two pistons 50 and 51 affixed to a piston rod 52 which is connected to a centrifugal weight mechanism 54. The centrifugal weight mechanism 54 is connected to a tachometer shaft 56 and translates the angular velocity of the shaft into the lateral movement of the rod 52. Thus, the centrifugal weight mechanism 54 responds to an increasing angular velocity of the tachometer shaft 56 to move the piston rod 52 to the right and out of the valve 34. When the angular velocity of the shaft decreases, the centrifugal weight mechanism moves the piston rod 52 to the left and into the valve 34.

The pistons 50 and 51 of the valve 34 are displaced in such a way that either one face or the other of the piston 18 is subjected to increasing servo-pressure, while the pressure on the other side of the piston is reduced. To achieve this function, the valve is provided with ports 58 and 59 to which the oil pressure lines 36 and 38 are connected, an oil delivery port 60 to which the oil reservoir 28 is connected through the pump 26, and a pair of drainage ports 62 and 63 to which the oil drain line 31 is connected. Depending upon the positions of the pistons 50 and 51, the oil delivery port 60 is connected with either the port 58 or the port 59, so that oil pressure delivered by the oil pump reaches one face or the other of the piston 18 to move the piston laterally within the housing 20 (FIG. 2).

As will be understood, depending on the size of the pistons 50 and 51 and the size and spacing of the oil supply and drainage ports, the operation of the valve may be controlled over a very broad range of velocities. In the alternative, displacement of the valve may be related to velocity over a limited range, and when a selected velocity is reached, the displacement remains constant. In this latter mode of operation, the collision sensor 15 will be completely retracted while the vehicle is at rest since there will be a direct connection within the valve between the oil supply port 60 and the oil delivery port 58. Likewise, there will be direct connection between drainage port 63 and the oil supply port 59.

Then, as the vehicle accelerates and the rod 52 is moved to the right, the supply port 60 will supply ever-increasing amounts of oil to the delivery port 59. When a preselected speed, such as 30 miles per hour, is reached, the valve connects without restriction the conduit 33 to conduit 38 and the conduit 31 to the conduit 36. Thus, the full pressure created by pump 36 will be supplied through the conduit 38 and the sensor will be displaced to its fullest extent. At the same time, the oil to the left of the piston 18 is evacuated through conduit 36 and returned to the reservoir by way of valve 34 and the conduit 31.

As shown in FIG. 3, the valve remains fixed during operation. This need not be the case, however, and in FIG. 4 there is shown a valve which is movable over a short distance within a stationary housing 79. In connection with the FIG. 4 embodiment, the displacement of the sensor 15 is translated back to the valve 34 by means of a rod 82 connected so as to pivot on the piston rod 16 at a junction point 83. The return rod 82 is mounted in a swivel bearing 84 and thus transmits the displacement motion of the piston rod 16 to a sliding rod 85 that is connected to the valve 34 and a swivel bearing 86 which is guided on the return rod 82. The constuction of the valve shown in FIG. 4 is the same as that shown in FIG. 3, with the exception that the ports are enlarged, as shown, to make it possible for the oil delivery and drainage lines to be connected to the corresponding ports of the valve even when there is maximum extreme displacement of the valve 34.

As shown in FIG. 3, the sensor 15 is in the form of a spring-loaded contact 90 which is closed by pressure exerted thereagainst. The contact 90 is electrically coupled between a battery 92 and an explosive charge 94. When ignited, the charge may fill a case folded in a steering wheel or to move a piston which tightens a safety belt placed around a passenger.

The embodiment of this invention described above is intended to be merely exemplary and those skilled in the art will be able to make numerous variations without departing from the spirit and scope of the invention. All such variations are intended to be included within the scope of the invention as defined by the following claims.

I claim:

1. An improved collision sensor for vehicles comprising a sensor located at the end of a rod adapted to extend the sensor beyond the bumper and main body of the vehicle for a distance dependent upon the speed at which the vehicle is traveling, said sensor being responsive to contact pressure for activating a safety mechanism that secures a passenger to his seat within the vehicle, and means for controlling the displacement of the rod so as to extend the sensor beyond the bumper and body of the vehicle as a function of the vehicle's speed to permit early activation of the safety mechanism in the event of a collision.

2. The improvement as in claim 1 wherein the collision sensor comprises an electrical contact responsive to contact pressure for permitting electrical current to flow to the safety mechanism.

* * * * *

UNITED STATES PATENT OFFICE
CERTIFICATE OF CORRECTION

Patent No. 3,842,930                     Dated October 22, 1974

Inventor(s) Ernst Fiala

It is certified that error appears in the above-identified patent and that said Letters Patent are hereby corrected as shown below:

Column 2, line 41, after "6" delete the comma;

Column 2, line 64, "and" should read -- an --;

Column 3, line 50, after "38" insert -- to --; and

Column 4, line 4, "position" should read -- piston --.

Signed and sealed this 22nd day of April 1975.

(SEAL)
Attest:

RUTH C. MASON
Attesting Officer

C. MARSHALL DANN
Commissioner of Patents
and Trademarks